United States Patent
Okabe et al.

(10) Patent No.: US 10,718,428 B2
(45) Date of Patent: Jul. 21, 2020

(54) CONTROLLER FOR VEHICLE TRANSMISSION

(71) Applicant: Hitachi Automotive Systems, Ltd., Hitachinaka-shi, Ibaraki (JP)

(72) Inventors: Yasuhiro Okabe, Hitachinaka (JP); Yusuke Masuda, Hitachinaka (JP); Daisuke Sekine, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 182 days.

(21) Appl. No.: 15/563,664

(22) PCT Filed: Jun. 10, 2016

(86) PCT No.: PCT/JP2016/067302
§ 371 (c)(1),
(2) Date: Oct. 2, 2017

(87) PCT Pub. No.: WO2017/002577
PCT Pub. Date: Jan. 5, 2017

(65) Prior Publication Data
US 2018/0066752 A1    Mar. 8, 2018

(30) Foreign Application Priority Data

Jun. 29, 2015 (JP) .................. 2015-129460

(51) Int. Cl.
*F16H 61/12* (2010.01)
*F02D 45/00* (2006.01)
(Continued)

(52) U.S. Cl.
CPC ............. *F16H 61/12* (2013.01); *F02D 41/22* (2013.01); *F02D 41/2422* (2013.01);
(Continued)

(58) Field of Classification Search
CPC ................. G06F 11/08; G06F 11/0796; F16H 2061/1224; F16H 2061/1268; F16H 61/12
See application file for complete search history.

(56) References Cited

U.S. PATENT DOCUMENTS 5,065,038 A * 12/1991 Isozumi
5,964,813 A    10/1999 Ishii et al.
(Continued)

FOREIGN PATENT DOCUMENTS

DE          100 02 306 A1    7/2001
DE    10 2013 222 338 A1    5/2014
(Continued)

OTHER PUBLICATIONS

Extended European Search Report issued in European Application No. 16817686.5 dated Feb. 10, 2020 (eight (8) pages).
(Continued)

*Primary Examiner* — Erin D Bishop
(74) *Attorney, Agent, or Firm* — Crowell & Moring LLP

(57) ABSTRACT

A controller for a vehicle transmission includes a storage part that stores data and a control part that executes processing by using the data stored in the storage part. The storage part stores a plurality of control processes of the vehicle transmission. The storage part further comprises a table including a start address and an end address of each of a first software program and a second software program as duplicated software programs, and the control unit executes the second software program instead of the first software program if the abnormal address is located between the first address and the end address of the first software program, and no abnormal address is located between the first address and the end address of the second software program.

5 Claims, 7 Drawing Sheets

(51) Int. Cl.

| | | |
|---|---|---|
| F16H 59/50 | (2006.01) | |
| F16H 59/68 | (2006.01) | |
| G06F 12/16 | (2006.01) | |
| F02D 41/22 | (2006.01) | |
| G06F 11/07 | (2006.01) | |
| F16H 61/00 | (2006.01) | |
| F02D 41/24 | (2006.01) | |
| F02D 41/26 | (2006.01) | |
| G06F 11/08 | (2006.01) | |
| F02D 41/02 | (2006.01) | |

(52) U.S. Cl.
CPC ............ *F02D 41/26* (2013.01); *F02D 45/00* (2013.01); *F16H 59/50* (2013.01); *F16H 59/68* (2013.01); *F16H 61/0006* (2013.01); *G06F 11/0739* (2013.01); *G06F 11/0751* (2013.01); *G06F 11/0793* (2013.01); *G06F 11/0796* (2013.01); *G06F 11/08* (2013.01); *G06F 12/16* (2013.01); *F02D 41/0215* (2013.01); *F02D 2041/227* (2013.01); *F16H 2061/1224* (2013.01); *F16H 2061/1268* (2013.01)

(56) References Cited

U.S. PATENT DOCUMENTS

| | | |
|---|---|---|
| 2006/0224292 A1 | 10/2006 | Iizuka |
| 2007/0198874 A1 | 8/2007 | Watanabe |
| 2014/0210395 A1 | 7/2014 | Nagata et al. |

FOREIGN PATENT DOCUMENTS

| | | |
|---|---|---|
| JP | 3-288208 A | 12/1991 |
| JP | 10-138780 A | 5/1998 |
| JP | 2001-75842 A | 3/2001 |
| JP | 2006-283832 A | 10/2006 |
| JP | 2007-205942 A | 8/2007 |
| JP | 2007-207092 A | 8/2007 |
| JP | 2008-39740 A | 2/2008 |
| JP | 2009-41602 A | 2/2009 |
| JP | 2010-117752 A | 5/2010 |
| JP | 2012-183951 A | 9/2012 |
| JP | 2014-142030 A | 8/2014 |
| WO | WO 96/25612 | 8/1996 |

OTHER PUBLICATIONS

International Search Report (PCT/ISA/210) issued in PCT Application No. PCT/JP2016/067302 dated Oct. 4, 2016 with English translation (Four (4) pages).

Japanese-language Written Opinion (PCT/ISA/237) issued in PCT Application No. PCT/JP2016/067302 dated Oct. 4, 2016 (Five (5) pages).

\* cited by examiner

CONTROLLER FOR VEHICLE TRANSMISSION

TECHNICAL FIELD

The present invention relates to a controller for a vehicle transmission.

BACKGROUND ART

As IEC 61508, ISO 26262, and the like have been established as international standards on functional safety, needs for safety performance of automobiles are increasing.

In order to meet the needs for safety performance, a microprocessor installed in a vehicle transmission has been equipped with a function capable of constantly monitoring a safety state, such as higher performance of a fault detection function for a read only memory (ROM). On the other hand, due to technical improvements in microprocessors, a ROM storage capacity is rapidly increasing, and a ROM failure rate tends to be high.

There is disclosed a technology for shifting to a fail-safe state when a failure occurs, including a ROM failure, in a controller of a vehicle transmission.

CITATION LIST

Patent Literature

PTL 1: JP 2009-41602A

SUMMARY OF INVENTION

Technical Problem

In PTL 1, there has been a problem that, in order to secure a safety state of a vehicle at a time of a ROM failure, a function of a vehicle transmission is restricted, and drivability is remarkably deteriorated.

The present invention has been made in view of the above problem, and it is an object of the present invention to provide a method of securing a safe state of a vehicle transmission and avoiding deterioration of drivability without restricting a function of the vehicle transmission when a ROM failure is detected.

Solution to Problem

In order to achieve the above object, the present invention has the following means.

A ROM mounted on a microprocessor is configured by a storage part that stores data, and a control part that executes a software program using the data. Based on information of a sensor attached to the vehicle transmission and information acquired from other ECUs, the control part is configured by a group of software programs that control an actuator of the vehicle transmission, and is disposed in the ROM in a unit of control.

The software programs are duplicated in the unit of control with identical contents. Selection of control to be duplicated depends on the ROM capacity, and a function capable of avoiding deterioration of drivability is preferentially duplicated. Hereinafter, the duplicated software program is referred to as alternative control.

A microprocessor function monitors a ROM failure, and acquires address information of a failure site when a ROM failure occurs.

With the address information of the ROM failure site and a failure-site-specifying data table, control at the failure site is specified.

Same control as in normal operation is performed with alternative control of the control at the ROM failure site.

If a ROM failure occurs in both the normal control and the alternate control, a fail-safe state in the prior art is set to restrict the function of the vehicle transmission, to ensure safety.

Advantageous Effects of Invention

According to the present invention, by performing the alternative control, the control of the vehicle transmission does not need to be restricted even if a ROM failure occurs, allowing avoidance of a decrease in drivability.

DESCRIPTION OF EMBODIMENTS

Hereinafter, embodiments of the present invention will be described in detail with reference to the drawings.

First Example

Figure 7:
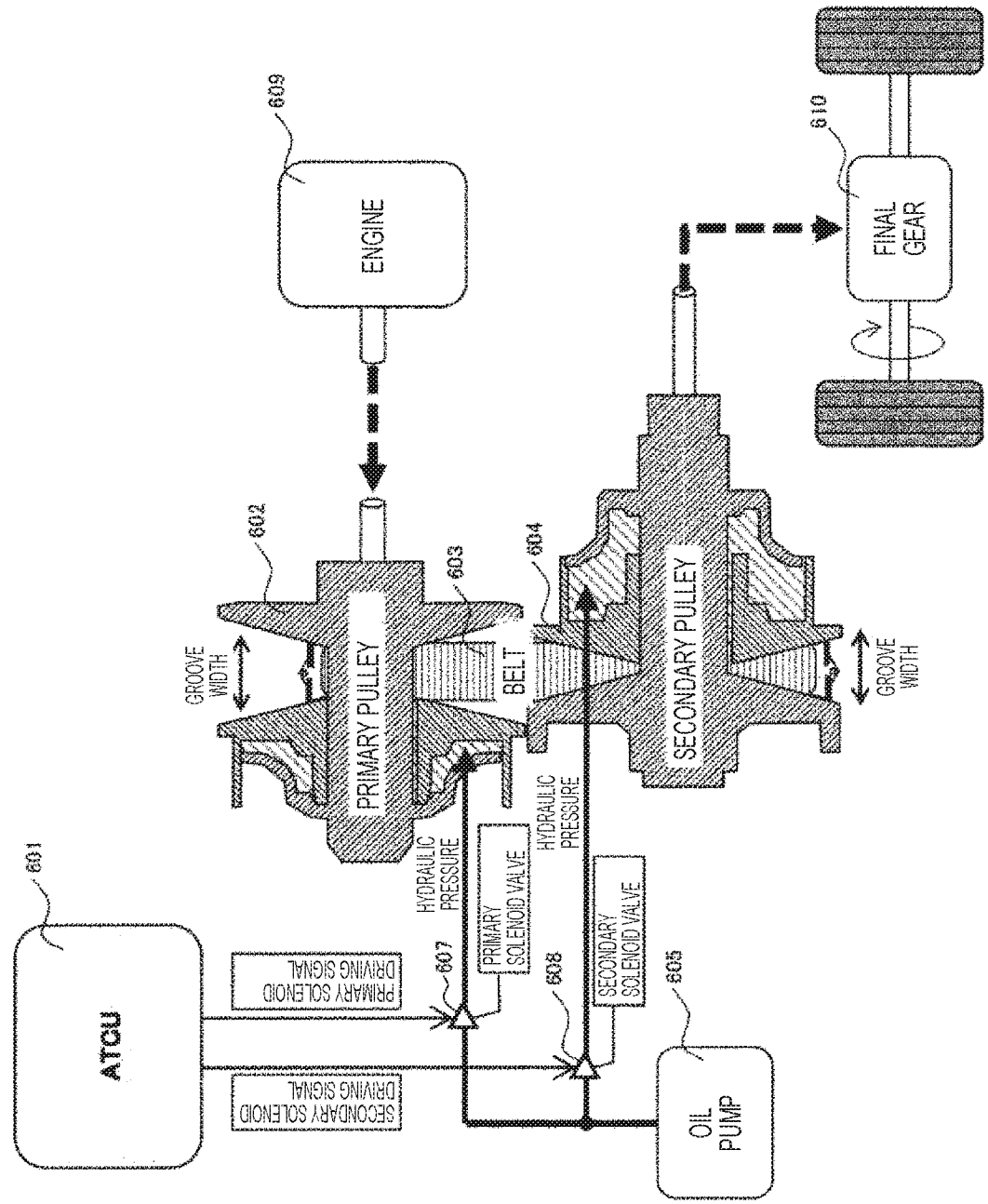
FIG. 7 shows an example of a system overview relating to a controller for a vehicle transmission.

An example of a system overview relating to a controller for a vehicle transmission will be described with reference to FIG. 7.

The vehicle transmission includes a primary pulley 602 that receives a driving force from an engine 609, a secondary pulley 604 that outputs the driving force to a final gear 610, and a belt 603 that connects the primary pulley 602 and the secondary pulley 604. The primary pulley 602 and the secondary pulley 604 can change a groove width with hydraulic pressure to change a gear ratio.

Additionally, there are provided an oil pump 605 that supplies oil to the primary pulley 602 and the secondary pulley 604, and a primary solenoid valve 607 and a secondary solenoid valve 608 that adjust an oil supply amount.

In an automatic transmission control unit (ATCU) 601, which is a controller for a vehicle transmission, by opening and closing the primary solenoid valve 607 and the secondary solenoid valve 608, the hydraulic pressures of the primary pulley 602 and the secondary pulley 604 are controlled, thereby to control the gear ratio of the vehicle transmission.

Figure 1:
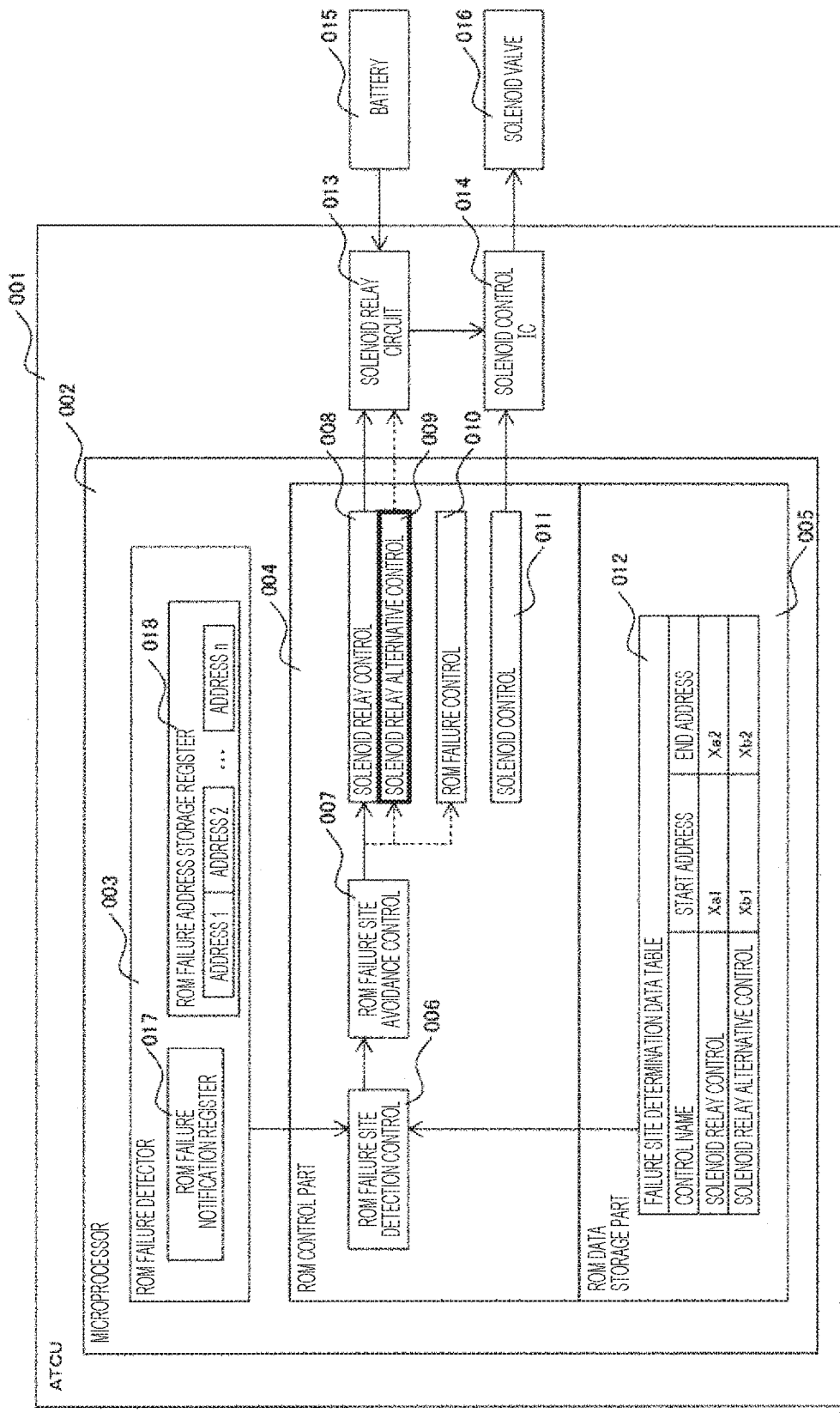
FIG. 1 shows an example of an embodiment of the present invention relating to solenoid relay control.

A first example of the present invention will be described with reference to FIGS. 1 to 3. FIG. 1 shows this example relating to solenoid relay control. In an ATCU 001, there are provided a microprocessor 002, a solenoid control IC 014 that receives a target current value from the microprocessor 002 to control a solenoid valve 016, and a solenoid relay circuit 013 that controls power supply from a battery 015 to the solenoid control IC 014.

In the microprocessor 002, there are provided a ROM data storage part 005 that stores data, a ROM control part 004 that stores a software program, and a ROM failure detector 003 that can detect a ROM failure address.

In the ROM failure detector 003, there are provided a ROM failure notification register 017 that stores information on presence/absence of an occurrence of a ROM failure, and a ROM failure address storage register 018 that stores n pieces of addresses at which the ROM failure has occurred. The ROM failure detector 003 is a function installed in the microprocessor 002, and monitors a ROM failure from start-up to a stop of the microprocessor.

In the ROM control part 004, there is provided a ROM failure site detection control 006, which is a software program to specify a failure site of the control part based on information of the ROM failure notification register 017 and the ROM failure address storage register 018, acquired from the ROM failure detector 003. A ROM failure site avoidance control 007 is a software program to avoid a failure site of the control part with the ROM failure site detection control 006. Solenoid relay control 008 is a software program to control ON/OFF of the solenoid relay circuit 013. The solenoid control 011 is a software program that gives a target instruction current to the solenoid control IC 014. A solenoid relay alternative control 009 is a software program having same contents as the solenoid relay control 008, as an alternative control to be performed when a ROM failure occurs. The ROM failure control 010 is performed when a ROM failure occurs in both the solenoid relay control 008 and the solenoid relay alternative control 009.

In the ROM data storage part 005, there is provided a failure site determination data table 012 to specify the ROM failure site. The failure site determination data table 012 includes a head address and an end address of the solenoid relay control 008 and the solenoid relay alternative control 009.

Figure 2:
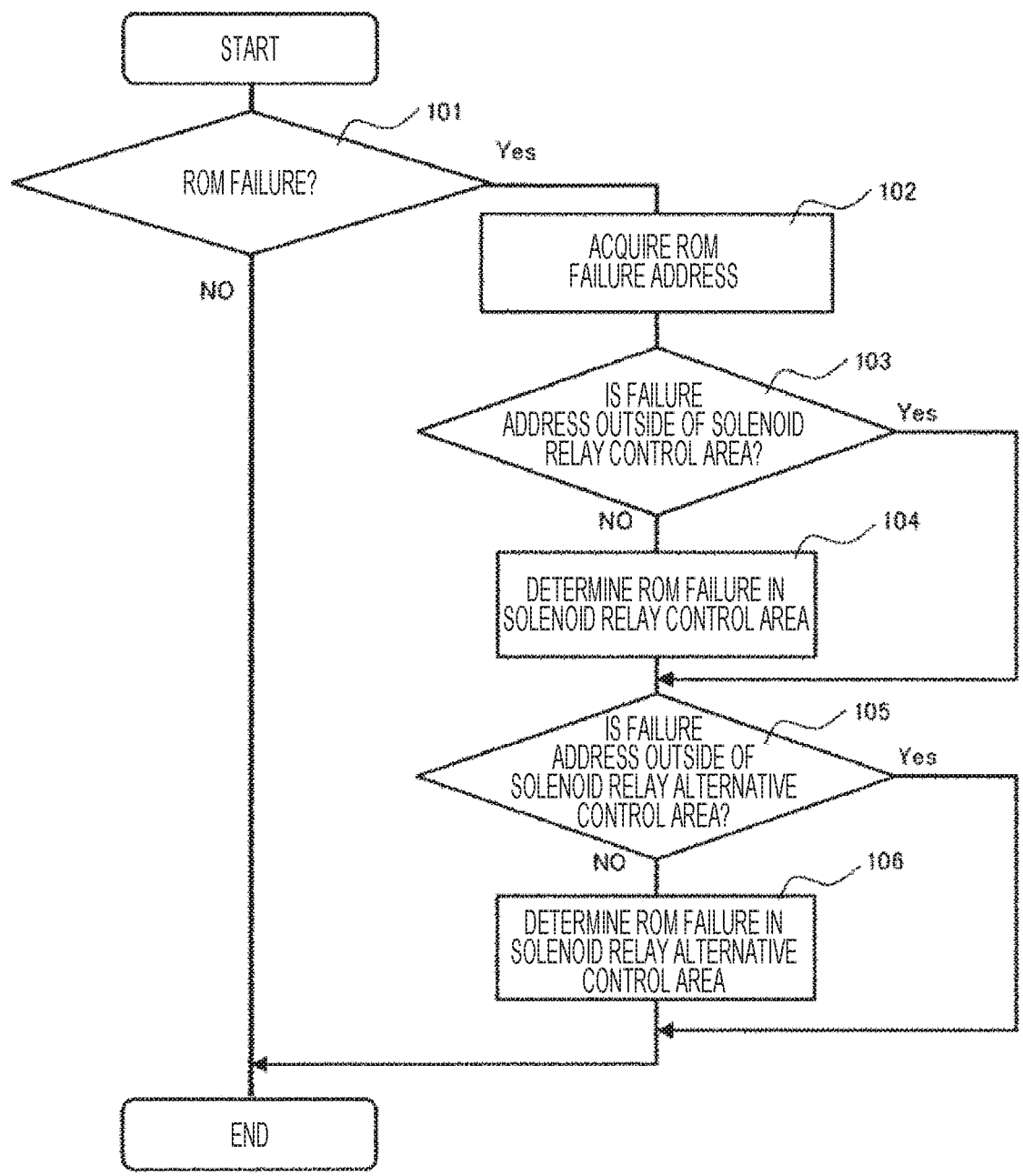
FIG. 2 is a flowchart of control for detecting a ROM failure site relating to the solenoid relay control.
Figure 3:
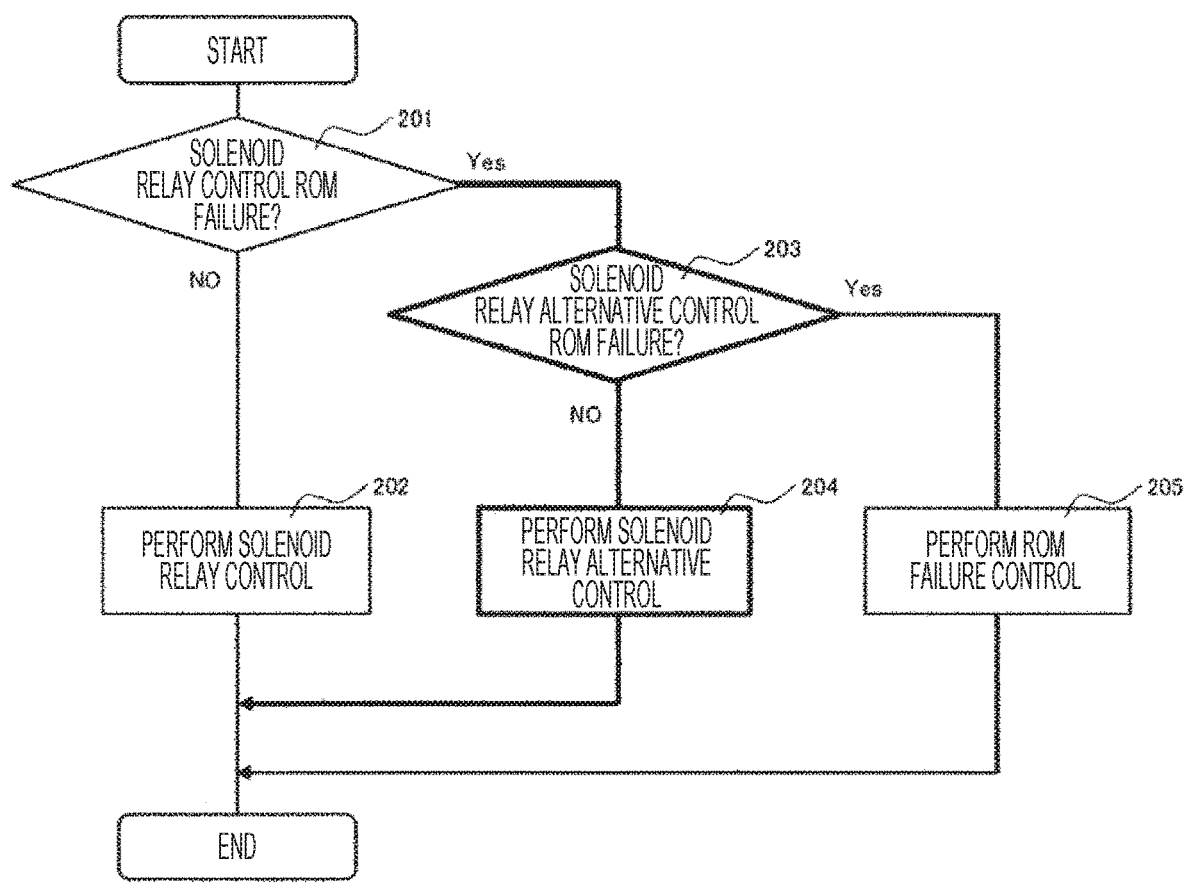
FIG. 3 is a flowchart of control for avoiding a ROM failure site relating to the solenoid relay control.

FIGS. 2 and 3 show an example of software processing according to this example relating to the solenoid relay control. During a period from start-up to an end of the microprocessor 002, the software processing is repeatedly performed in the order of FIG. 2 and FIG. 3 in a fixed cycle.

FIG. 2 is a flowchart of control for detecting a ROM failure site relating to the solenoid relay control 008. The ROM failure notification register 017 of the ROM failure detector 003 determines presence/absence of an occurrence of a ROM failure (101). If the ROM failure is determined, ROM failure address information is acquired from the ROM failure address storage register 018 of the ROM failure detector 003 (102).

The failure address information (102) is compared with the head address or the end address of the solenoid relay control provided in the failure site determination data table 012 (103). At this time, when the failure address information (102) is within between the head address and the end address of the solenoid relay control, a ROM failure in the solenoid relay control is determined (104).

Next, the failure address information (102) is compared with the head address or the end address of the solenoid relay alternative control provided in the failure site determination data table 012 (105). At this time, when the failure address information (102) is within between the head address and the end address of the solenoid relay alternative control, a ROM failure in the solenoid relay alternative control is determined (106).

The information on presence/absence of a ROM failure in the solenoid relay control 008 or presence/absence of a ROM failure in the solenoid relay alternative control 009 is referred to in the ROM failure site avoidance control 007, and avoidance control of the ROM failure site is performed.

FIG. 3 is a flowchart of control for avoiding a ROM failure site relating to the solenoid relay control 008. Whether to avoid the solenoid relay control is determined (201) by solenoid relay control ROM failure determination (104) of the ROM failure site detection control 006. When a ROM failure in the solenoid relay control has not been determined, the solenoid relay control (202) is performed.

When a ROM failure in the solenoid relay control has been determined, whether to avoid the solenoid relay alternate control is determined (203) by solenoid relay alternative control ROM failure determination (106) of the ROM failure site detection control 006. When a ROM failure in the solenoid relay alternative control has not been determined, the solenoid relay alternative control (204) is performed.

When both the solenoid relay control and the solenoid relay alternative control have been determined to have a ROM failure, the ROM failure control 010 (205) is performed. For example, when the ROM failure control 010 is executed, the software stops control of each actuator of the vehicle transmission. In this case, safety is secured by fixing the gear ratio with hardware control of the vehicle transmission, but drivability is remarkably deteriorated.

In a conventional controller for a vehicle transmission, when a ROM failure has been determined in the solenoid relay control, the ROM failure control 010 has been executed. According to this example, however, by performing the solenoid relay alternative control, the ROM failure control 010 can be avoided, allowing avoidance of deterioration in drivability.

As described above, the controller for a vehicle transmission according to this example includes the ROM data storage part 005 that stores data, the ROM control part 004 that executes processing by using the data stored in the ROM data storage part 005. The ROM control part 004 stores a plurality of control processes of the vehicle transmission, in which, among the plurality of control processes, a control process that causes the vehicle transmission to be uncontrolled when a control process cannot be performed is duplicated and stored.

The control process that causes the vehicle transmission to be uncontrolled here may be a relay control process of the solenoid coil described above, or a monitoring process of the ignition SW to be described in a second example. These relate to an actuator that must be at least controlled as the ATCU 001 when a ROM failure occurs. Conversely, if the actuator does not have to be controlled when a ROM failure occurs, there is no problem without duplicating the software program, but the present invention is not limited to this.

That is, duplicating all the control processes stored in the ROM control part 004 enables alternative control with the duplicated control process when a failure occurs in a storage area for a certain control process. However, duplication of all control processes is not realistic because of the storage capacity of the ROM control part 004.

Therefore, in this example, only a specific control process is duplicated to the ROM control part 004. If the duplication has not been made, the controller is determined to be unable to control the transmission when a failure occurs in a storage area storing the relay control process of the solenoid coil described above. However, in this case, safety is secured by fixing the gear ratio of the vehicle transmission, remarkably deteriorating drivability.

On the other hand, in this example, the control process that causes the vehicle transmission to be uncontrolled, such as the relay control process of the solenoid coil, is duplicated and stored in the ROM control part 004. This allows the ROM control part 004 to perform alternative control with the control contents duplicated and stored to continue the normal control, even when a failure occurs in the storage area of the relay control process of the solenoid coil.

This eliminates necessity of making the capacity of the ROM control part 004 extremely large, and enables suppression of an increase in cost and a significant decrease in drivability due to fixing of the gear ratio of the vehicle transmission.

Second Example

Figure 4:
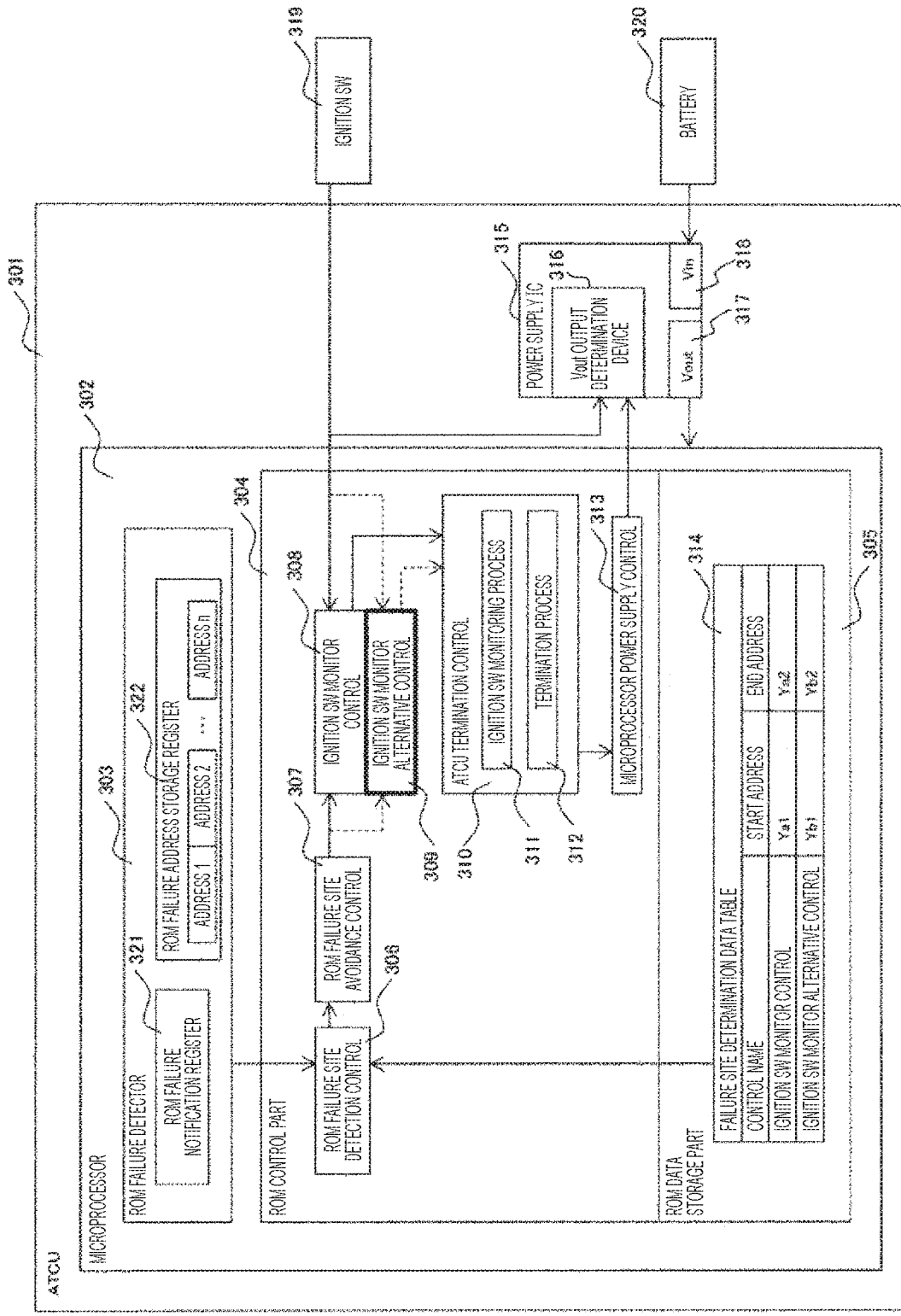
FIG. 4 shows an example of an embodiment of the present invention relating to ignition SW monitor control.

A second example of the present invention will be described with reference to FIGS. 4 to 6. FIG. 4 shows an example of an embodiment of the present invention relating to ignition SW monitor control. In an ATCU 301, there are provided a microprocessor 302, and a power supply IC 315 that supplies power to the microprocessor 302. In the power supply IC 315, there are provided a Vin 318 that receives power supply from a battery 320, a Vout 317 that supplies power to the microprocessor, and a Vout output permission determination device 316 that permits output of the Vout 317. Signals from the ignition SW 319 and a microprocessor power supply control 313 are input to the Vout output permission determination device 316, and when one of the inputs is in an ON state, the output of the Vout 316 is permitted.

In the microprocessor 302, there are provided a ROM data storage part 305 that stores data, a ROM control part 304 that stores a software program, and a ROM failure detector 303 that can detect a ROM failure address.

In the ROM failure detector 303, there are provided a ROM failure notification register 321 that stores information on presence/absence of an occurrence of a ROM failure, and a ROM failure address storage register 322 that stores n pieces of addresses at which the ROM failure has occurred. The ROM failure detector 003 is a function installed in the microprocessor 002, and monitors a ROM failure from start-up to a stop of the microprocessor.

In the ROM control part 304, there is provided a ROM failure site detection control 306, which is a software program to specify a failure site of the control part based on information of the ROM failure notification register 017 and the ROM failure address storage register 018, acquired from the ROM failure detector 303. The ROM failure site avoidance control 307 is a software program to avoid a failure site of the control part with the ROM failure site detection control 306. Ignition SW monitor control 308 monitors a voltage of the ignition SW 319. An ignition SW monitor alternative control 309 is a software program having the same contents as the ignition SW monitor control 308, as an alternative control to be performed when a ROM failure occurs. ATCU termination control 310 performs processing for avoiding a failure of the vehicle transmission and the ATCU 301. An ignition SW monitoring process 311 constantly monitors ON/OFF of the ignition SW 319. The termination process 312 is performed when the ignition SW is OFF, in which processing for avoiding a failure of the ATCU 301, such as an initialization process of the microprocessor 302, is performed. The microprocessor power supply control 313 controls power supply to the microprocessor 302 by the power supply IC 315.

In the ROM data storage part 305, there is provided a failure site determination data table 314 to specify the ROM failure site. The failure site determination data table 314 includes a head address and an end address of the ignition SW monitor control 308 and the ignition SW monitor alternative control 309.

Figure 5:
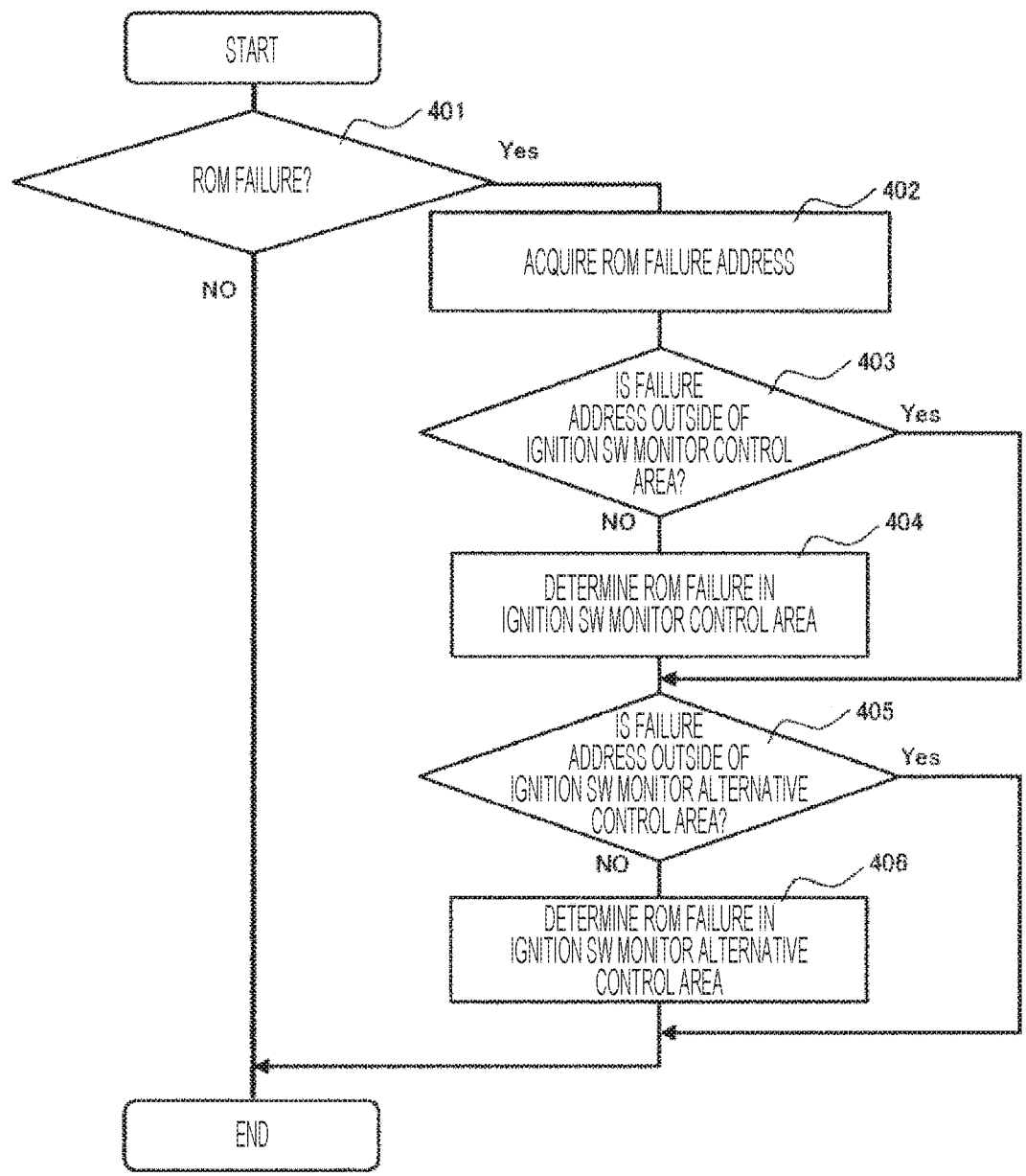
FIG. 5 is a flowchart of control for detecting a ROM failure site relating to the ignition SW monitor control.
Figure 6:
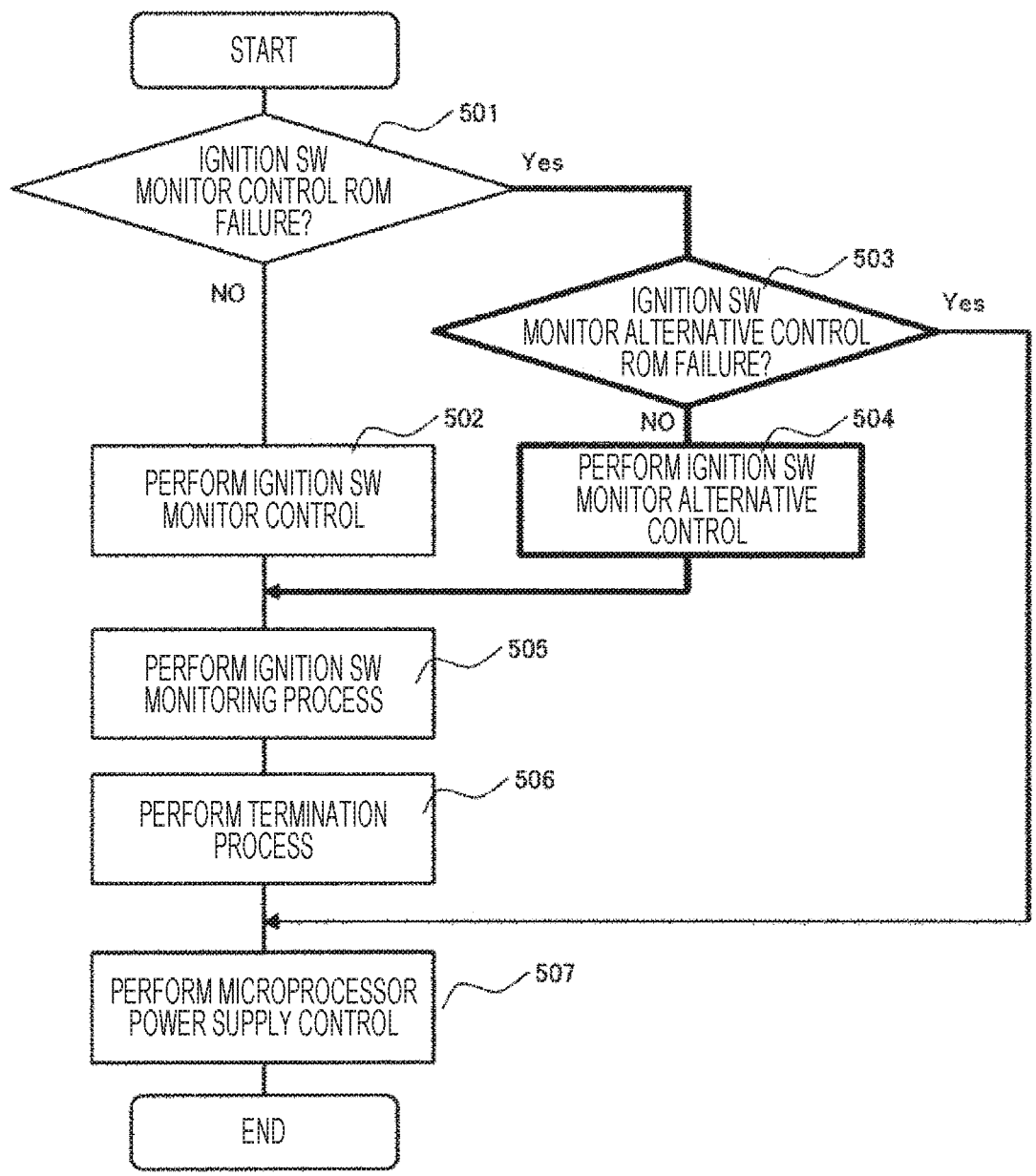
FIG. 6 is a flowchart of control for avoiding a ROM failure site relating to the ignition SW monitor control.

FIGS. 5 and 6 show an example of software processing according to this example relating to the ignition SW monitor control. During a period from start-up to an end of the microprocessor 302, the software processing is repeatedly performed in the order of FIG. 5 and FIG. 6 in a fixed cycle.

FIG. 5 is a flowchart of control for detecting a ROM failure site relating to the ignition SW monitor control 308. The ROM failure notification register 321 of the ROM failure detector 303 determines presence/absence of an occurrence of a ROM failure (101). If the ROM failure is determined, ROM failure address information is acquired from the ROM failure address storage register 322 of the ROM failure detector 303 (402).

The failure address information (402) is compared with the head address or the end address of the ignition SW monitor control provided in the failure site determination data table 314 (403). At this time, when the failure address information (402) is within between the head address and the end address of the ignition SW monitor control, a ROM failure in the ignition SW monitor control is determined (404).

Next, the failure address information (402) is compared with the head address or the end address of the ignition SW monitor alternative control provided in the failure site determination data table 314 (405). At this time, when the failure address information is within between the head address and the end address of the ignition SW monitor alternative control, a ROM failure in the ignition SW monitor alternative control is determined (406).

The information on presence/absence of a ROM failure in the ignition SW monitor control 308 or presence/absence of a ROM failure in the ignition SW monitor alternative control 309 is referred to in the ROM failure site avoidance control 307, and avoidance control of the ROM failure site is performed.

FIG. 6 is a flowchart of control for avoiding a ROM failure site relating to the ignition SW monitor control 308. Whether to avoid the ignition SW monitor control is determined (501) by an ignition SW monitor control ROM failure determination (404) of the ROM failure site detection control 306. When a ROM failure in the ignition SW monitor control has not been determined, the ignition SW monitor control (502) is performed.

When a ROM failure in the ignition SW monitor control has been determined, whether to avoid the ignition SW monitor alternative control is determined (503) by the ignition SW monitor alternative control ROM failure determination (406) of the ROM failure site detection control 006. When a ROM failure in the ignition SW monitor alternative control has not been determined, the ignition SW monitor alternative control (504) is performed.

When both the ignition SW monitor control and the ignition SW monitor alternative control have been determined to have a ROM failure, the ignition SW monitoring process 311 (505) and the termination process 312 (506) of the ATCU termination control 305 are not performed.

For example, when both the ignition SW monitor control and the ignition SW monitor alternative control have been determined to have a ROM failure, control to safely terminate the ATCU is not performed, which may cause a failure of the ATCU. A failure of the ATCU disables control of each actuator of the vehicle transmission. In this case, safety is secured by fixing the gear ratio with hardware control of the vehicle transmission, but drivability is remarkably deteriorated.

On the other hand, when either of the ignition SW monitor control and the ignition SW monitor alternative control has been determined not to have a ROM failure, the ignition SW monitoring process 311 (505) and a termination process 312 (506) of the ATCU termination control 305 are performed, to safely terminate the ATCU.

In a conventional controller for a vehicle transmission, the ATCU termination control 305 cannot be executed when a ROM failure in the ignition SW monitor control has been determined, but performing the ignition SW monitor alternative control enables the ATCU termination control 305 according to the present invention, which can prevent an ATCU failure and can avoid deterioration of drivability.

In this example, only a specific control process is duplicated to the ROM control part 304. If the duplication has not been made, control to safely terminate the ATCU 301 is not performed, which may cause a failure of the ATCU 301 when a failure occurs in the storage area storing the above-described ignition SW monitor control process. A failure of the ATCU 301 disables control of the vehicle transmission. However, in this case, safety is secured by fixing the gear ratio of the vehicle transmission, remarkably deteriorating drivability.

On the other hand, in this example, the control process that causes the vehicle transmission to be uncontrolled, such as the ignition SW monitor control process, is duplicated and stored in the ROM control part 004. This allows the ROM control part 004 to perform alternative control with the control contents duplicated and stored to continue the normal control, even when a failure occurs in the storage area of the ignition SW monitor control process.

This eliminates necessity of making the capacity of the ROM control part 004 extremely large, and enables suppression of an increase in cost and a significant decrease in drivability due to fixing of the gear ratio of the vehicle transmission.

REFERENCE SIGNS LIST

002 microprocessor
003 ROM failure detector
004 ROM control part
005 ROM data storage part
007 ROM failure site avoidance control
008 solenoid relay control
009 solenoid relay alternative control
013 solenoid relay circuit
014 solenoid control IC
015 battery
016 solenoid valve
017 ROM failure notification register
018 ROM failure address storage register
601 ATCU (Automatic Transmission Control Unit)
602 primary pulley
604 secondary pulley
607 primary solenoid valve
608 secondary solenoid valve

The invention claimed is:

1. A controller for a vehicle transmission comprising:
a storage part that stores data; and
a control part that executes processing by using the data stored in the storage part, wherein
the storage part stores a plurality of control processes of the vehicle transmission,
among the plurality of control processes, a first software program corresponding to either of a monitoring process of an ignition switch (SW) and a relay control process of a solenoid coil is duplicated and stored in a ROM, a second software program is duplicated and stored on the ROM, wherein the ROM comprises the control part and the storage part, wherein
when an abnormal address is detected in the storage part corresponding to either of the monitoring process of the ignition SW and the relay control process of the solenoid coil, the control part performs the monitoring process of the ignition SW or the relay control process of the solenoid coil by a same contents duplicated and stored in the storage part, and
the storage part further comprises a table including a start address and an end address of each of the first software program and the second software program as duplicated software programs, and the control unit executes the second software program instead of the first software program if the abnormal address is located between the first address and the end address of the first software program, and no abnormal address is located between the first address and the end address of the second software program.

2. The controller for the vehicle transmission according to claim 1, wherein the control part controls opening and closing of a relay that turns on or off power supply to a control Integrated Circuit (IC) of the solenoid coil by the relay control process.

3. The controller for the vehicle transmission according to claim 1, wherein the control part detects a state of the ignition SW by the monitoring process, executes a predetermined termination process after the ignition SW is turned off, and then turns off power supply to a microcomputer.

4. The controller for the vehicle transmission according to claim 1, wherein the storage part duplicates at at least the relay control process of the solenoid coil among the plurality of control processes.

5. The controller for the vehicle transmission according to claim 1, wherein the storage part duplicates the monitoring process of the ignition SW in the control part that turns off at least power supply to a microcomputer, among the plurality of control processes.

* * * * *